United States Patent
Von Den Hoff et al.

[15] 3,704,649
[45] Dec. 5, 1972

[54] DEVICE FOR ADJUSTING THE CROSS-RAIL ON PORTAL TYPE MACHINE TOOLS

[72] Inventors: Toni Von Den Hoff; Ewald Weber, both of Coburg, Germany

[73] Assignee: Werkzeugmaschinenfabrik Adolf Waldrich Coburg, Coburg, Bayern, Germany

[22] Filed: Jan. 27, 1971

[21] Appl. No.: 110,019

[30] Foreign Application Priority Data

Feb. 6, 1970    Germany.....................P 20 05 555.4

[52] U.S. Cl.....................90/15, 90/37, 90/DIG. 28, 82/2 D
[51] Int. Cl. ............................................B23q 23/00
[58] Field of Search...........90/37, DIG. 28, 11 R, 15; 82/2 D

[56] References Cited

UNITED STATES PATENTS 3,027,813    4/1962    Seborg......................................90/15

*Primary Examiner*—Francis S. Husar
*Attorney*—Woodhams, Blanchard & Flynn

[57] ABSTRACT

A device for adjusting the cross-rail on a portal type machine tool wherein an adjusting device is provided between an abutment member and a nut and which is movable transversely of the spindle axis by means of an adjusting motor and is provided with a slot extending in its direction of movement for the passage of the elevating screw. It is through this structure that one end of the cross-rail may be vertically adjustable independently of the other end of the cross-rail to maintain same in a generally horizontal relationship parallel to, for example, the plane of the worktable.

6 Claims, 5 Drawing Figures

3,704,649

DEVICE FOR ADJUSTING THE CROSS-RAIL ON PORTAL TYPE MACHINE TOOLS

The invention relates to a device for adjusting the cross-rail on portal type machine tools having an elevating screw engaging a nut in the region of each rail end, an abutment for the support of the nut at each rail end and an adjusting device, whereby one of the rail ends is in addition vertically adjustable as a function of the deviation of the rail from the desired horizontal position.

In adjusting the cross-rail on such machine tools, it is important that the cross-rail should retain its horizontal position parallel to the table plane. This requirement is not always satisfied when, for example in planing machines, a number of heads, some of them heavy, such as milling heads, are provided and are arranged unsymmetrically on the rail ends. One of the two adjusting devices acting on the rail ends is thereby loaded more heavily than the other, resulting in oblique positioning of the cross-rail through deformation of the adjusting device.

To remove this disadvantage, an adjusting device is already known, in which the upper axial bearing, mounted in the portal, is carried by a sleeve, which is mounted non-rotatably but axially movable in the portal. The sleeve is axially movable by means of an external screwthread by a wormwheel embracing it and provided with an internal screwthread corresponding to the external screwthread of the sleeve. To produce a sufficiently sensitive adjustment, however, in addition to the said wormwheel, a second wormwheel and a gearwheel mechanism are provided between the auxiliary motor driving the adjustment device. The auxiliary motor itself is controlled by means of a suitable displacement measuring device exploring the horizontal position.

This known device for adjusting the cross-rail on portal type machine tools has, however, the disadvantage of a comparatively large overall size, mainly due to the necessary two worm gears and the gear casing provided for housing them. Such a bulky adjusting device, however, cannot be mounted on the cross-rail of the machine tool, should this be desired. In addition, owing to the necessary worm gears, it is expensive to manufacture. Furthermore, many worm gears have an exceptionally low efficiency and the installed power for an adjusting device must therefore be comparatively high.

The invention is based on the problem of providing a device for adjusting the cross-rail on portal type machine tools of the aforesaid kind which with small overall size is simpler and therefore cheaper to manufacture and which on account of its small overall size can be mounted on the cross-rail itself.

This is achieved according to the invention in that as adjusting device between the abutment and nut there is provided a wedge which is movable transversely of the screw axis by means of a servomotor and which has a slot extending in its sliding direction of movement for the passage of the elevating screw. This construction takes up extremely small space. Owing to the short movement distances and the slow movement of the wedge, extremely small demands are required of the lubrication of the wedge faces. Expensive gear housing, taking up considerable room, can thus be dispensed with. For driving the wedge it is advantageously possible to use a commercially available gearwheel motor, which also requires little space. The new device is also simple in construction since the wedge and the counter-faces co-operating with it are much cheaper to make than one or more worm gears. Owing to the small space requirement the new device can be mounted on the cross-rail itself. In addition, the new device has a better efficiency.

Further advantages and details of the invention are explained more particularly in the following with reference to embodiment examples illustrated in the drawings, in which.

Figure 1:
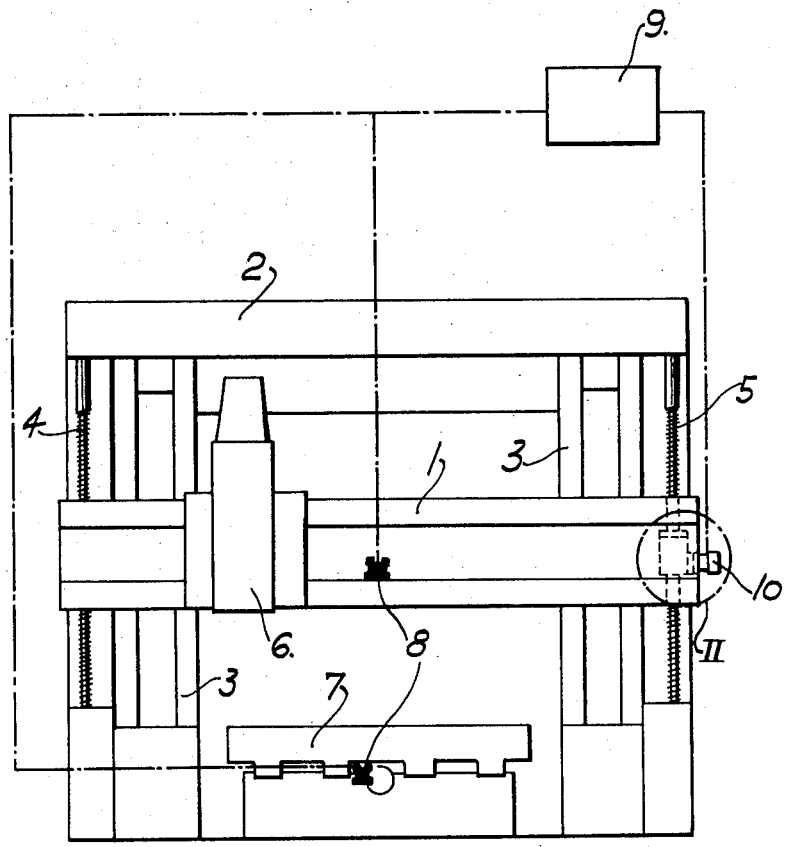
FIG. 1 shows a diagrammatic representation of the entire arrangement.
Figure 2:
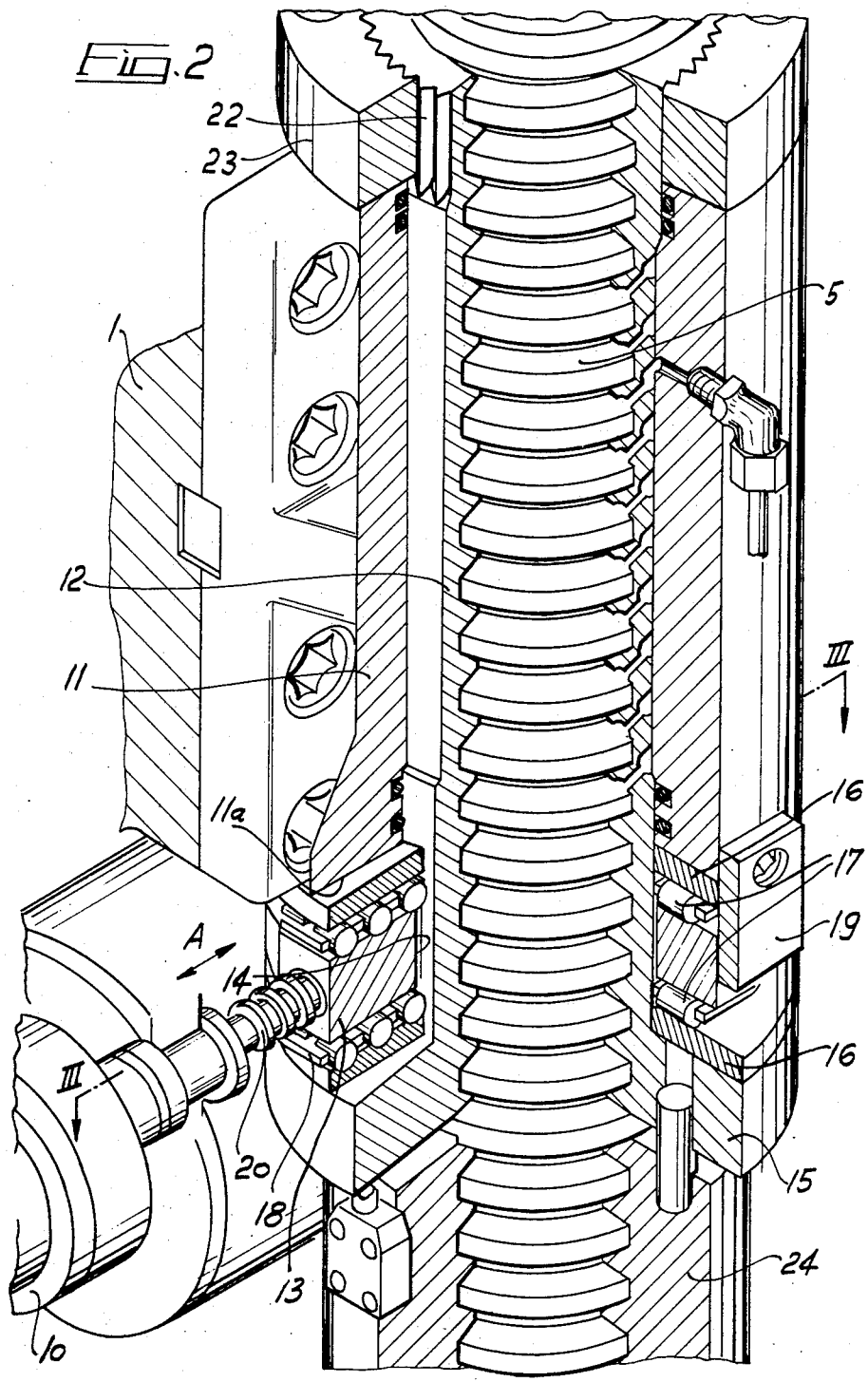
FIG. 2 shows details of a first embodiment example of the adjusting device in perspective view, partly in section at the place II of FIG. 1.
Figure 3:
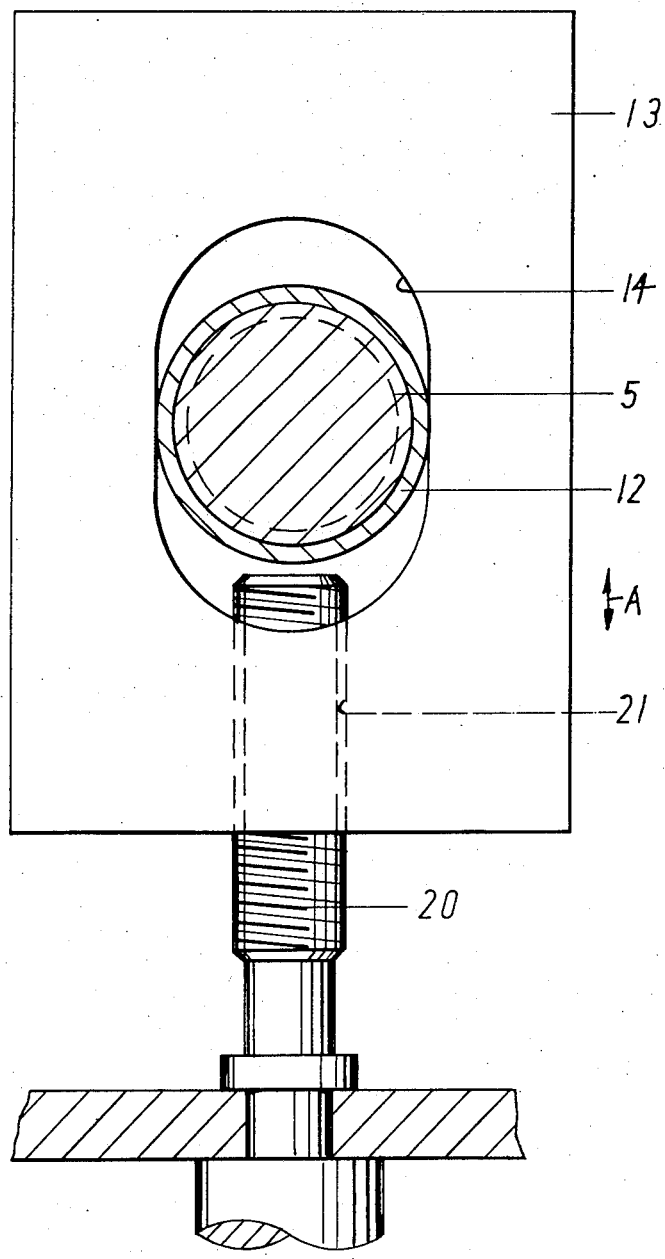
FIG. 3 is a cross-section on the line III—III in FIG. 2.

As shown by FIG. 1, the cross-rail 1 is guided for vertical movement on the uprights 3 connected together by the cross-head 2. The drive is by elevating screws 4 and 5 respectively engaging each rail end. The elevating screws 4,5 are driven by a common drive accommodated in the cross-head 2. Due to the unsymmetrical position of the milling head 6, of which in practice usually a number are mounted on the cross-rail 1, the elevating screws 4,5 are loaded differently, whereby the cross-rail 1 can set itself obliquely relative to the table 7. This oblique position is detected by an electronic angle-measuring device or other misalignment measuring device. The electronic angle-measuring device transmits to the adjusting motor 10 of the adjusting device shown in FIGS. 2 and 3 control pulses until the horizontal position of the cross-rail 1 is restored.

According to the invention, as adjusting device between the abutment 11 of the nut 12, there is provided a wedge 13, which is movable transversely of the screw axis by means of an adjusting motor, and which is provided with a slot 14 for the passage of the elevating screw 5. In the embodiment example shown in FIGS. 2 and 3, the nut 12 is axially movable in a sleeve 11 connected to the cross-rail 1 and serving as abutment. The nut 12 has a flange 15 on its lower end projecting beyond the sleeve 11. The wedge 13 is arranged between the said flange 15 and the lower end 11a of the sleeve. It is here advantageous, as shown in the drawing, to provide on both sides rolling elements 17 between the wedge and the parts 16 co-operating with it. The rolling elements are guided in a cage 18, cut out to correspond with the slot 14. The parts 16 are made of wear-resistant material. For the lateral guiding of the wedge, a guide plate 19 may furthermore be fixed to the sleeve 11.

The drive of the wedge 13 is produced by the screwthreaded spindle 20, engaging an internal screwthread 21 provided in the wedge. A gearwheel motor is advantageously provided as adjusting motor 10, which drives the axially immovably mounted screwthreaded spindle 20.

For guiding the nut 12 axially movable in the sleeve 11, but to prevent it from rotating, the upper end of the nut projects beyond the sleeve 11 and is there provided with wedge teeth 22. These wedge teeth are engaged by a ring 23 provided with corresponding wedge teeth and non-rotatably screwed to the sleeve 11.

Below the flange 15 a locknut 24 may also be provided in the manner known per se.

The spindle 20 is set in left-hand or right-hand rotation by the adjusting pulses supplied to the adjusting motor 10, and hence the wedge 13 is moved in the direction A in one sense or the other, thereby altering the distance of the flange 15 of the nut 12 from the lower end 11a of the sleeve 11 serving as abutment, the cross-rail 1 being thereby raised or lowered. By suitable choice of the angle which the wedge faces of the wedge 13 make with each other, an extremely sensitive adjustment of the cross-rail may be obtained.

Figure 4:
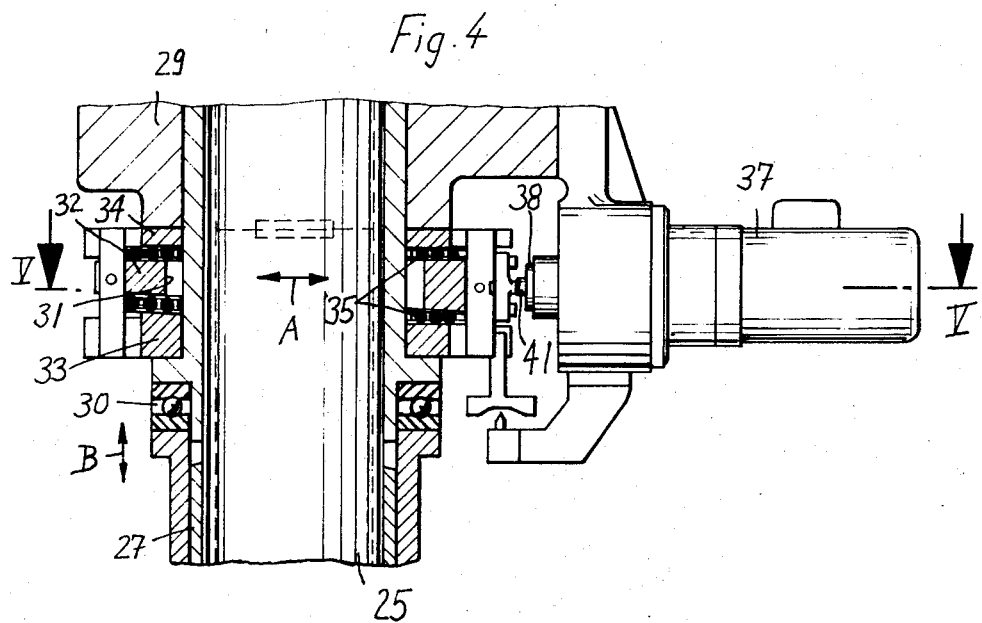
FIG. 4 shows a second embodiment example in longitudinal section.
Figure 5:
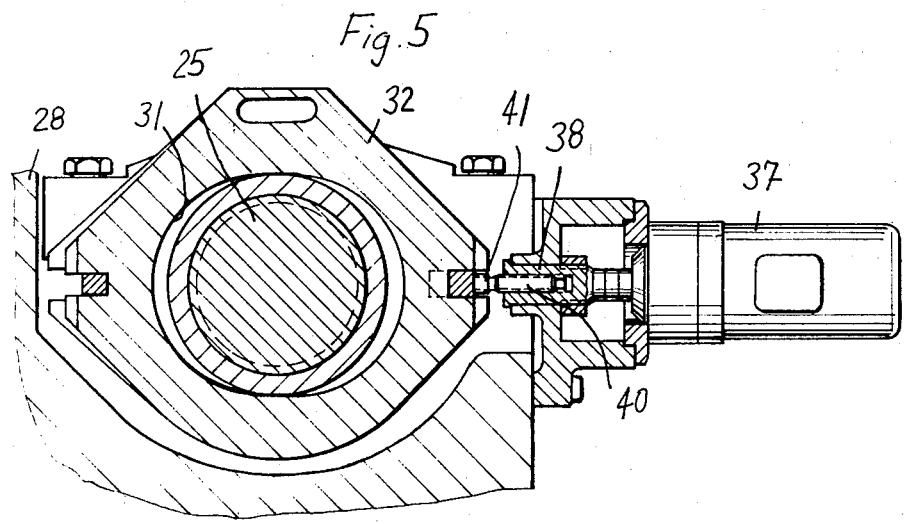
FIG. 5 shows a cross-section on the line V—V of FIG. 4.

In FIG. 4 is shown another embodiment example, in which the elevating screw 25 is static. The nut 27 is driven by a drive, not shown, arranged in the cross-rail 28. The abutment 29 is rigidly connected to the cross-rail 28. An axial bearing 30 is provided on the upper end of the nut 27. Between this axial bearing 30 and the abutment 29 is arranged a wedge 32 provided with a slot 31, carrier rings 33 and 34 being arranged in the embodiment example shown on both sides of the wedge, on which rings the wedge is supported by the rolling elements 35. The adjusting motor 37 drives the axially fixed nut 38, which co-operates with an external screwthread 40 of the pressure rod 41, rigidly connected to the wedge 32. By rotation of the nut 38, therefore, the wedge is moved in one sense or the other in the direction A, and hence the cross-rail is raised or lowered in the direction B.

The invention is not restricted to the embodiment examples shown. For example, it would also be conceivable to arrange the slotted wedge between the upper axial bearing of the elevating spindle and the abutment in the cross-head of the machine tool.

The embodiments of the invention in which an exclusive property or privilege is claimed are defined as follows:

1. A device for adjusting the cross-rail on portal type machine tools, having an elevating screw engaging a nut in the region of each end of the rail, an abutment at each rail end for supporting the nut and an adjusting device, whereby one end of the rail is additionally vertically adjustable as a function of the deviation of the rail from the desired horizontal position, independently of the other end of the rail, wherein the adjusting device comprises a wedge (13, 22) located between the abutment (11, 29) and the nut (12, 27) and is movable transversely of the spindle axis by means of an adjusting motor (10) and provided with a slot (14, 31), extending in its direction of movement (A) for the passage of the elevating screw (5, 25).

2. Device according to claim 1, wherein the wedge is supported on both sides by means of rolling elements on the parts co-operating with it.

3. Device according to claim 1, wherein the nut (12) is displaceable in the axial direction in a sleeve (11) directed to the cross-rail (1) and serves as the abutment, and on the lower end (11a) of the nut projecting beyond the sleeve (11) is a flange (15), the wedge (13) being arranged between the flange (15) and the lower end (11a).

4. Device according to claim 3, wherein the upper end of the nut (12) projects beyond the sleeve (11) and is there non-rotatably connected by means of wedge teeth (22) to a ring (23) fixed to the sleeve.

5. Device according to claim 1, wherein the drive of the wedge (13) is effected by a screwthreaded spindle (20), which is driven by a gearwheel motor (10) and engages a female screwthread provided in the wedge (13).

6. Device according to claim 1 having a stationary screw and a rotatable nut supported on the abutment by means of an axial bearing, wherein the wedge (32) is arranged between the axial bearing (30) and the abutment (29).

* * * * *

UNITED STATES PATENT OFFICE
CERTIFICATE OF CORRECTION

Patent No. 3,704,649     Dated December 5, 1972.

Inventor(s) Toni Von Den Hoff and Ewald Weber

It is certified that error appears in the above-identified patent and that said Letters Patent are hereby corrected as shown below:

Column 4, line 21; change "directed" to ---connected---.

Signed and sealed this 12th day of June 1973.

(SEAL)
Attest:

EDWARD M. FLETCHER, JR.
Attesting Officer

ROBERT GOTTSCHALK
Commissioner of Patents